United States Patent [19]
Durante

[11] Patent Number: 5,431,074
[45] Date of Patent: Jul. 11, 1995

[54] LUG NUT REMOVAL DEVICE

[76] Inventor: Frank P. Durante, 44 Punta Prieta Dr., Perris, Calif. 92571

[21] Appl. No.: 235,383

[22] Filed: Apr. 29, 1994

[51] Int. Cl.⁶ .............................................. B25B 13/06
[52] U.S. Cl. ..................... 81/462; 81/177.2; 81/124.4; 81/125.1
[58] Field of Search ............... 81/462, 177.1, 177.2, 81/177.5, 124.7, 124.4, 125.1, 489, 180.1

[56] References Cited

U.S. PATENT DOCUMENTS

| | | | |
|---|---|---|---|
| 1,741,810 | 12/1929 | Bidal | 81/177.2 |
| 4,619,161 | 10/1986 | Reynolds | 81/462 |
| 4,620,462 | 11/1986 | Parker | 81/462 |

FOREIGN PATENT DOCUMENTS 2040770  9/1980  United Kingdom .

Primary Examiner—D. S. Meislin
Attorney, Agent, or Firm—R. Joseph Trojan

[57] ABSTRACT

The present invention is directed to a device for removing lug nuts from the axles of vehicles. The improvement comprising a stabilization platform having four legs with at least one of the legs having an incline edge which has at least one retaining means or notch formed therein. The platform interacts with a torque tool having a socket arm with a lug nut socket at one end and an extension arm secured at a right angle to the socket arm. When the socket engages a lug nut, the socket arm is placed within the retaining means and the extension arm is actuated to remove or tighten the lug nut.

14 Claims, 2 Drawing Sheets

LUG NUT REMOVAL DEVICE

BACKGROUND OF THE INVENTION

1. Field of the Invention

This invention relates to a device and method to assist in the removal and/or tightening of lug nuts.

2. Background of the Invention

The present invention is a new system to assist in the removal of tires from motor vehicles. It is well known that lug nuts used to secure tires to a vehicle can frequently be very difficult to remove. This is sometimes caused by the lug nuts being secured too tightly by power tools at service stations. Other times the lug nuts may bond to the threading because of rust. But whatever the cause, it can be especially difficult for a strong, able bodied person to remove the lug nuts using a conventional lug wrench or tire iron. For anyone not up to the challenge, the task of removing a lug nut can sometimes be impossible. Furthermore, the exertion required can result in personal injury to a person's back or can cause a hernia. The physical effort required can be especially dangerous for older travellers whose health may already be compromised. As a result, a traveller might find him or herself stranded if they are unable to remove a flat tire or injured if they attempt to use conventional portable tire removal tools without proper regard for their physical limitations.

The present invention overcomes the many shortcoming and dangers of the prior art. The invention includes a lug nut socket arm or socket means connected at a right angle to an extension arm, which is referred to collectively as the torque tool or leverage assembly. The leverage assembly is too cumbersome to use by itself. The invention also includes a stabilization platform, which is used to stabilize the socket arm to permit the leverage assembly to engage the lug nut. Once the leverage assembly has engaged the lug nut, the user pulls or pushes down on the extension arm. The added torque provided by the extension arm permits the user to break free even the most stubborn lug nut.

The stabilization platform includes at least four legs, which are substantially at right angles to each other. At least one of the legs or plates has an angled or inclined edge. At least one retaining means or recess or notch is cut or formed in the angled edge. The socket arm rests within the recess when the socket engages the lug nut. In this way, the stabilization platform is able to support the socket arm to prevent the socket from disengaging the lug nut when the user applies tangential force to the extension arm.

The wheels of virtually all vehicles known to the inventor are secured to the axle with multiple attachment means, which are usually lug nuts. Typically, each lug nut is positioned around the circumference of the axle, which results in each being at a different height from the ground. In the preferred embodiment, each of the legs has an angular or inclined edge with multiple recesses formed in each. The practical result is each leg having recesses at a different heights. This allows the user to adjust to the height of each lug nut. Each recess can be numbered so that the user can remember which recesses to use when putting on and taking off each wheel. Also the legs can be marked with on and off notations to assist the user in remembering which direction will remove or tighten the lug nut.

The added torque provided by the invention permits most any adult to loosen a lug nut with far less effort than previously required. Hence, the invention provides a means for giving a far greater number of people the independence to change a tire without having to wait for assistance. This lessens the time the user is stranded at the side of the road thereby reducing the time the user is exposed to the possibility of being struck by another vehicle or being accosted by persons with malevolent motives. The relative ease with which the invention can be used when compared to the prior art also reduces the chances of personal injury because the user does not have to strain to the same degree as before.

SUMMARY OF THE INVENTION

One of the main objects of the present invention is to provide a means for more easily removing tires from motor vehicles;

Another object of the present invention is to provide a means for giving a greater number of people the ability to change a tire;

Yet another object of the present invention is to provide a means for reducing personal injuries arising out the normal strain associated with breaking lug nuts free;

Another object of the present invention is to provide a tire changing device that reduces the physical effort required to change a tire;

An additional object of the present invention is to provide a lug nut actuation device that can be disassembled for easy storage within a vehicle; and, A further object of the invention is to provide a means for changing tires more quickly thereby reducing the time the user is exposed to road hazards;

These and other objects and advantages of the present invention will become apparent from the following detailed description of the preferred embodiment of the invention without intending to limit the scope of the invention which is set forth in the appended claims.

BRIEF DESCRIPTION OF THE DRAWINGS

The advantages of the invention can be more clearly understood by reference to the drawings in which.

DETAILED DESCRIPTION OF THE PREFERRED EMBODIMENT

Figure 1:
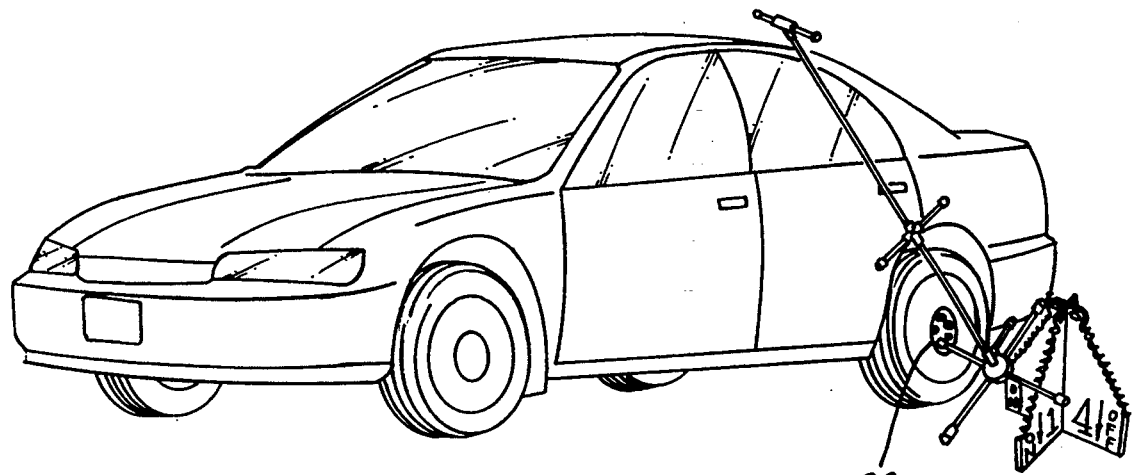
FIG. 1 is an environmental view of the invention when in position ready for use.
Figure 2:
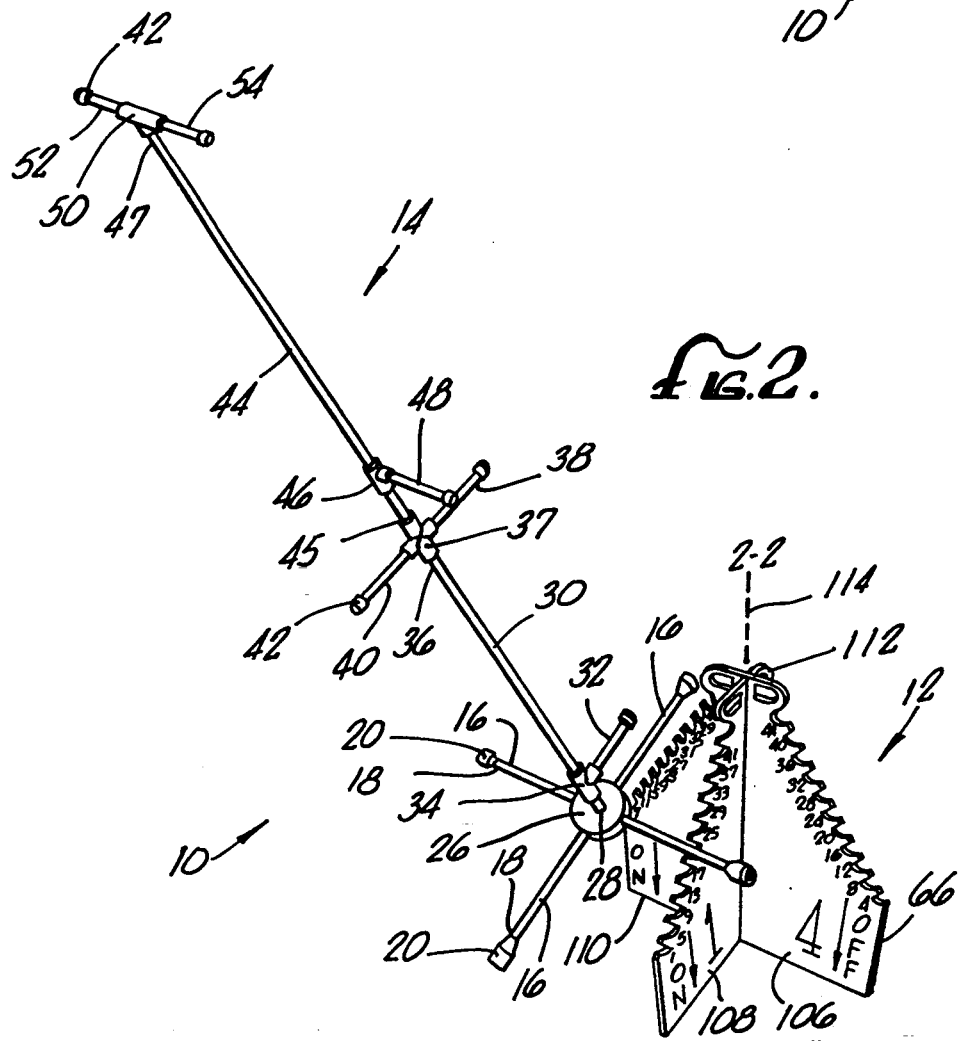
FIG. 2 is an perspective view of the invention.

FIG. 2 illustrates the invention, a lug nut removal assembly generally designated 10. The lug nut removal assembly 10 is comprised of two components, a stabilization platform 12 and a leverage assembly or torque tool The torque tool 14 is comprised of a first arm or socket arm 16 and a second arm or extension arm 30. In the preferred embodiment shown in FIG. 2, there are four socket arms 16 joined together by a central hub 26. Each socket arm has a terminal end 18 at which a socket 20 is formed for engaging a lug nut 22. Preferably, each of the four sockets 20 is of a different size to accommodate different sized lug nuts. A standard four pronged tire iron can be adapted for use with the invention by including a centrally located attachment means so that it can be secured to the extension arm 14.

The extension arm 14 may be entirely made from one length of piping or may be sectional as shown in FIG. 2. In the preferred embodiment, the extension arm 14 has an elongated first section 30 having a proximal end 28 and a distal end 37. The proximal end 28 is secured to the center of the hub 26 at a right angle to the socket arm 16. The proximal end 28 may be integrally formed with the hub 26. However, it is preferred that they be joined by means that permit the extension arm 14 to be detachable from the hub 26 such as by standard pipe threading. This permits the invention to be disassembled to make it easier to store in the trunk of a vehicle. To assist in screwing the proximal end 28 into the hub 26, a handle 32 is secured to the first section 30 at roughly a right angle using a standard T-coupling 34 or the handle 32 may be integrally formed with the first section 30. The handle 32 should preferably be positioned in proximity to the proximal end 28.

The distal end 36 of the first section 30 may be joined to a second section 44 to make the extension arm 14 longer to provide greater torque. However, the first section 30 may also serve as the extension arm 14 without any further additions to its length. But the extension arm 14 is generally longer than the socket arm 16. The socket arm 16 is generally between twelve and sixteen inches. The extension arm 14 is generally between two feet and four feet in length, depending upon whether the second section 44 is used, but may be longer or shorter given the particular application.

To assist in the use of the invention without the second section 44, actuation grips 38, 40 are secured to the first section 30 in close proximity to the distal end 36. The actuation grips 38, 40 can be integral with the first section 30 or may be detachable by using a cross coupling 37. The actuation grips 3 are usually at right angles to the extension arm. When the invention is in use, the grips 38, 40 should be rotated so that they are parallel to the particular socket arm 16, which has been selected to engage the lug nut 22.

The second section 44 also has a proximal end 45 and a distal end 47. The proximal end 45 of the second section 44 is detachably secured to the distal end 36 of the first section 30 by any appropriate means. A coupling 37 can be used, which employs standard pipe threading. To assist in screwing the proximal end 45 of the second section 44 to the distal end 36 of the first section 30, a second handle 48 is secured to the second section 44 at roughly a right angle using a standard T-coupling 46 or the handle 48 may be integrally formed with the second section 40. The handle 48 should preferably be positioned in proximity to the proximal end 45. The first and second sections 30, 44 may also be secured together so that the second section 44 telescopes axially from the first section 30.

To assist in the use of the invention, actuation grips 52, 54 are secured to the second section 44 in close proximity to the distal end 47. The actuation grips 52, 54 can be integral with the second section 44 or may be detachable by using a T-coupling 50. The actuation grips 52, 54 are usually at right angles to the extension arm. When the invention is in use, the grips 52, 54 should be rotated so that they are parallel to the particular socket arm 16, which has been selected to engage the lug nut 22.

The stabilization platform 12 can be of any configuration which permits the socket arm 16 to rest in axial alignment with the lug nut 22 that the user has selected for removal. In the preferred embodiment, the platform 12 is comprised of a first plate 56 and a second plate 58. Both plates 56, 58 have a bottom edge 60, a top edge 62, side edges 64 and a width 66. The width 66 of the plates 56, 58 is approximately a half inch, but can be wider or narrower depending upon the material used to make the plates 56, 58. The distance from one side edge 64 of the plate 56 to the opposite side edge 64 is approximately twenty-one inches. The height of the platform 12 as measured from the bottom edge 60 to the top edge 62 of the plates is approximately twenty inches. This is a practical height for most automobiles. However, the platform 12 may need to be taller to use the invention with vehicles with larger wheels such as those used on commercial trucks.

The two plates 56, 58 bisect each other as shown in FIG. 2 to form the platform 12. The plates may be integrally formed together, however, it is preferable that they be easily disassembled so that they can lay flat when in storage. Any means of securing the plates together would be acceptable. In the preferred embodiment, the first plate 56 has a slit 80 extending vertically from the top edge 62 downward to a floor 88. The floor 88 is approximately at the midpoint between the top edge 62 and the bottom edge 60 of the first plate 56 and substantially bisects the first plate 56. The second plate 58 has a slit 82, which compliments the slit 80 in the first plate 56. The slit 80 in the second plate 58 extends vertically from the bottom edge 62 upward to a ceiling 89. The ceiling 89 is approximately at the midpoint between the top edge 62 and the bottom edge 60 of the second plate 58 and substantially bisects the second plate 58. The platform 12 is assembled by standing the first plate 56 on its bottom edge 60 and holding the second plate 58 above and perpendicular to the first plate 56. The slit 82 in the bottom edge 60 of the second place 58 is aligned with the slit 80 in the top edge 62 of the first plate 56. The two plates are dovetailed together so that the floor 88 of the first plate 56 and the ceiling 89 of the second plate 58 are flush thereby creating the platform 12. When the plates 56, 58 are assembled, they form four legs, 106, 108, 110, and 112. Each of the four legs 106, 108, 110, and 112 extend from a central axis 114 and each of the legs are at substantially right angles to two of the other three legs and in planar alignment with one of the other legs.

Finger holes 86 are included in proximity to the top edge 62 to assist in separating the two plates 56, 58 during disassembly. The platform 12 can be integrally formed as one unit, but the use of two plates is better because it provides for easier storage in a vehicle when disassembled. The finger holes 86 are also helpful for moving the assembled platform 12 into position.

At least one of the plates has at least one inclined edge 70, which is roughly at a 45° angle relative to the bottom edge 60. The inclined edge 70 can extend from the bottom edge 60 to the top edge 62 or any distance in between. The most important feature of the incline edge is that it have at least one retention means 78. The retention means can be in the form of a recess or groove or notch 78 as shown in the drawings, but any means that permits the socket arm 16 to rest in axial alignment with the lug nut without excessive lateral movement is sufficient.

In the preferred embodiment, the first plate 56 has two opposing incline edges 70, 71 having a plurality of retention means or notches 78 formed or cut in the incline edges 70, 71 at roughly one inch increments. The second plate 58 also has two opposing incline edges 73, 75 having a plurality of retention means or notches 78 formed or cut in the incline edges 73, 75 at roughly one inch increments. The notches 78 on each edge 70, 71, 73, 75 are staggered relative to each other so that there is an effective height incrementation of notches 78 of roughly a quarter inch among them. This permits the user to rest the socket arm 16 in a notch 78 that is substantially at the same height as the lug nut that is being removed. For many purposes, a half inch incrementation has been found to be satisfactory.

Figure 3A:
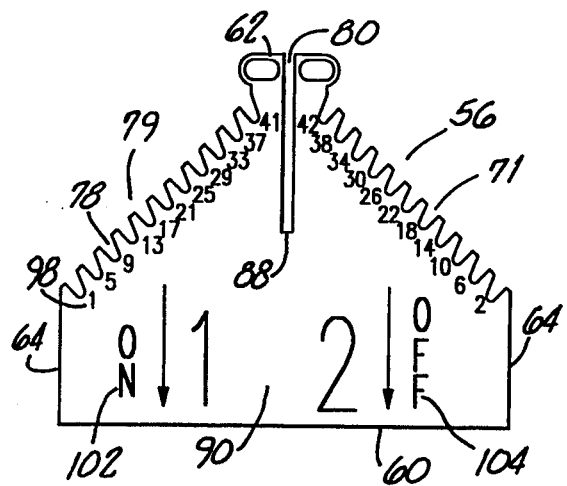
FIG. 3A is a side elevational view of the front face of the first plate of the stabilization platform.
Figure 3B:
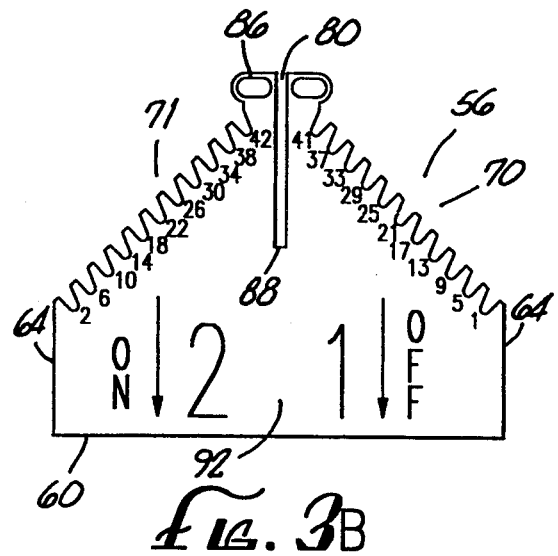
FIG. 3B is a side elevational view of the reverse face of the first plate of the stabilization platform.

FIGS. 3A and 3B are of the first plate 56. The first plate 56 has a front face 90 and a reverse face 92. On each face, there are a series of numbers 98 in which each number is positioned in proximity to a notch 78. The numbers 98 are in sequential order corresponding to the increasing height of the notches 78. The numbers are present for the convenience of the user to assist in remembering which notches 78 were the proper height for removing the lug nuts. This information is helpful when removing more than one tire and when putting the tire back on.

Figure 4A:
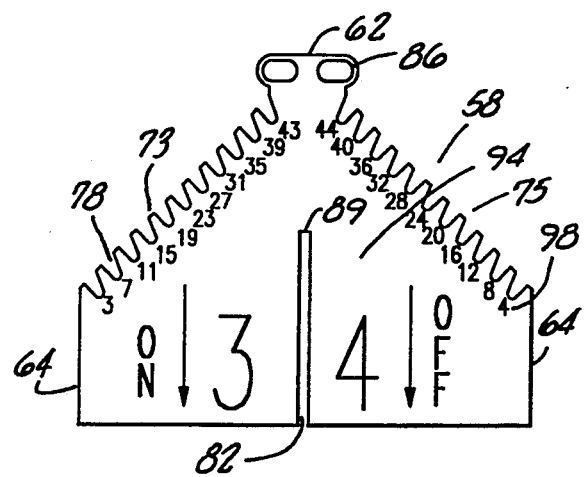
FIG. 4A is a side elevational view of the front face of the second plate of the stabilization platform; and, FIG. 4B is a side elevational view of the reverse face of the second plate of the stabilization platform.
Figure 4B:
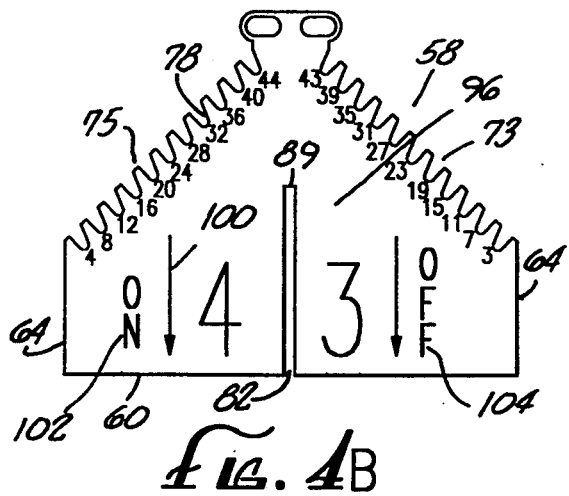

Each face 90, 92 has vertical arrows 100 pointing downward. Next to each arrow 100 is either ON 102 or OFF 104. This notation informs the user whether downward motion of the extension arm will either put the lug nut on or take the lug nut off when the user is using the notches 78 above the notation 100, 102, 104 and user is facing the notation. FIGS. 4A and 4B are of the second plate 58. The second plate 58 also has a front face 94 and a reverse face 96. The same notations described for faces 90, 92 of the first plate 56 are also present on the faces 94, 96 of the second plate 58. In addition, each of the four legs 106, 108, 110, 112 of the platform 12 can be numbered to provide an additional frame of reference to assist the user in remembering which of the four legs is being used.

The platform 12 can be made out of metal, wood or a high impact plastic. The inventor has used a polyvinyl plastic because it is light weight, strong and is easy to assemble and transport. The torque tool can be made out of any strong material, but is preferably made out of forged steel. The inventor has used metal piping for prototypes and have found it to function well. Conventional protective caps 42 may be placed at the end of each pipe where appropriate to prevent injury.

The invention is operated by setting the platform 12 in close proximity to the lug nut(s) which the user wants to remove or attach. The socket arm 16 is placed in the appropriate notch 78 and the socket 20 engages the lug nut. The user pulls down on the actuation grips 42, 54 to break the lug nut free or to tighten the lug nut, depending upon whether the user is standing in the OFF 104 or ON 102 position. In this way, the user is able to remove or tighten lug nuts with greater ease than previously possible.

The invention and its attendant advantages will be understood from the foregoing description and it will be apparent that various changes may be made without departing from invention's spirit.

I claim:

1. A device for removing a wheel lug nut from the axle of a vehicle, comprising:
    a stabilization platform having a first plate and a second plate, said plates substantially bisecting each other at right angles, at least one of said plates having at least one socket arm receiving means;
    a torque tool having at least one socket arm having at least one socket, said tool also having an extension arm, said socket arm secured substantially perpendicular to said extension arm, whereby said socket arm rests perpendicularly within one of said receiving means to permit said socket to engage said wheel lug nut and said extension arm is pushed downward to turn said lug nut; and,
    said first plate and said second plate both have a bottom edge, a top edge, at least one side incline edge, and a slit, said incline edge including said retention means, said slit in said first plate extending vertically from said top edge of said first plate, said slit in said second plate extending vertically from said bottom edge of said second plate, whereby said slit of said first plate and said slit of said second plate are dovetailed together.

2. A device for removing a wheel lug nut from the axle of a vehicle, which comprises:
    a torque tool, which includes a socket arm having a length and a terminal end, said terminal end having means for engaging a lug nut, an extension arm having a length, which is greater than the length of said socket arm, said extension arm having a proximal end and a distal end, said proximal end of said extension arm secured to said socket arm at substantially right angles;
    a stabilization platform including a first plate and a second plate, which substantially bisect each other, both of said plates having a substantially flush bottom edge, at least one of said plates having an incline edge above said bottom edge, said incline edge having at least one retaining means formed therein, whereby said socket arm rests within said retaining means to permit rotational movement of said extension arm during use.

3. A lug nut removal device as in claim 2 wherein said extension arm includes a first elongated section and a second elongated section, both of said sections having a proximal end and a distal end, said proximal end of said first section detachably secured to said socket arm, and said distal end of said first section detachably secured to said proximal end of said second section.

4. A lug nut removal device as in claim 2 wherein actuation grip means are secured to said distal end of said extension arm.

5. A lug nut removal device as in claim 2 wherein said extension arm includes a first elongated section and a second elongated section, both of said sections having a proximal end and a distal end, said proximal end of said first section detachably secured to said socket arm, a first handle secured perpendicularly to said first section in proximity to said proximal end of said first section, said distal end of said first section detachably secured to said proximal end of said second section, and a second handle secured perpendicularly to said second section in proximity to said proximal end of said second section whereby first and second handles assist in the assembly of said torque tool.

6. A lug nut removal device as in claim 2 wherein said retention means is a notch.

7. A lug nut removal device as in claim 2 wherein said first plate and said second plate are integrally formed.

8. A device for removing a wheel lug nut from the axle of a vehicle, which comprises:
    a torque tool, which includes a socket arm having a length and a terminal end, said terminal end having means for engaging a lug nut, an extension arm having a length, which is greater than the length of said socket arm, said extension arm having a proximal end and a distal end, said proximal end of said extension arm secured to said socket arm at substantially right angles;

a stabilization platform having four legs, each of said legs extending from a central axis, each of said legs at substantially right angles to two of the other three legs and in planar alignment with one of the other legs, at least one of said legs having at least one retaining means, whereby said socket arm rests within said retaining means to permit rotational movement of said extension arm during use.

9. A lug nut removal device as in claim 8 wherein said extension arm includes a first elongated section and a second elongated section, both of said sections having a proximal end and a distal end, said proximal end of said first section detachably secured to said socket arm, and said distal end of said first section detachably secured to said proximal end of said second section.

10. A lug nut removal device as in claim 8 wherein actuation means are secured to said distal end of said extension arm.

11. A lug nut removal device as in claim 8 wherein said extension arm includes a first elongated section and a second elongated section, both of said sections having a proximal end and a distal end, said proximal end of said first section detachably secured to said socket arm, a first handle secured perpendicularly to said first section in proximity to said proximal end of said first section, said distal end of said first section detachably secured to said proximal end of said second section, and a second handle secured perpendicularly to said second section in proximity to said proximal end of said second section whereby first and second handles assist in the assembly of said torque tool.

12. A lug nut removal device as in claim 8 wherein said retention means is a notch.

13. A lug nut removal device as in claim 8 wherein said legs are integrally formed.

14. A lug nut removal device as in claim 8 wherein there are a plurality of retaining means.

* * * * *